(12) United States Patent
Donaldson et al.

(10) Patent No.: US 8,935,852 B2
(45) Date of Patent: Jan. 20, 2015

(54) PREALLOYED COPPER POWDER FORGED CONNECTING ROD

(75) Inventors: Ian W. Donaldson, Jefferson, MA (US); Timothy E. Geiman, South Lyon, MI (US); Ray K. Williams, Saline, MI (US); Brandon A. Nichols, Emplorium, PA (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 567 days.

(21) Appl. No.: 12/810,109

(22) PCT Filed: Dec. 23, 2008

(86) PCT No.: PCT/US2008/088157
§ 371 (c)(1),
(2), (4) Date: Sep. 22, 2010

(87) PCT Pub. No.: WO2009/088771
PCT Pub. Date: Jul. 16, 2009

(65) Prior Publication Data
US 2011/0000457 A1    Jan. 6, 2011

(51) Int. Cl.
*B22F 3/02* (2006.01)
*C22C 33/02* (2006.01)
*B22F 5/00* (2006.01)
*F16C 7/02* (2006.01)
*B22F 5/10* (2006.01)

(52) U.S. Cl.
CPC ............. *C22C 33/0207* (2013.01); *B22F 5/008* (2013.01); *F16C 7/023* (2013.01); *B22F 5/10* (2013.01); *B22F 2998/10* (2013.01)

USPC .................................. 29/888.09; 29/888.092

(58) Field of Classification Search
USPC ................... 419/26, 28, 29, 61, 26.28, 29.61; 29/888, 888.09, 888.092; 123/197.3
See application file for complete search history.

(56) References Cited

U.S. PATENT DOCUMENTS

| | | |
|---|---|---|
| 3,737,301 A | 6/1973 | Chu |
| 3,889,350 A | 6/1975 | Mocarski |
| 3,901,661 A * | 8/1975 | Kondo et al. ................... 75/255 |
| 4,069,044 A | 1/1978 | Mocarski et al. |
| 4,071,354 A | 1/1978 | Mocarski |

(Continued)

FOREIGN PATENT DOCUMENTS

| | | |
|---|---|---|
| JP | S61117203 A | 6/1986 |
| JP | H01165702 A | 6/1989 |

(Continued)

OTHER PUBLICATIONS

Huber, Paul; Engineered Systems for Forging Operations: An Inside Look Into Seco/Warwick's Structure and Global Operations Will Allow You to Learn More About Forging Processes and Techniques; Aug. 2006; Gear Solutions; pp. 38,40.*

(Continued)

*Primary Examiner* — Christopher Besler
(74) *Attorney, Agent, or Firm* — Quarles & Brady LLP

(57) ABSTRACT

A process for manufacturing connecting rods is provided which comprises the steps of compacting, sintering, and powder forging a powder metal comprising a carbon source and a prealloyed powder consisting essentially of iron and copper. The connecting rods made from this process have sufficient hardness and strength to be used in an engine and do not require any additional quenching or tempering.

8 Claims, 4 Drawing Sheets

(56) References Cited

U.S. PATENT DOCUMENTS

| | | | |
|---|---|---|---|
| 4,093,449 A | | 6/1978 | Svensson et al. |
| 4,382,818 A | | 5/1983 | Mocarski |
| 4,722,209 A | * | 2/1988 | Mankins .................. 72/38 |
| 4,913,739 A | | 4/1990 | Thummler et al. |
| 5,108,493 A | | 4/1992 | Causton |
| 6,074,599 A | * | 6/2000 | Murty et al. .................. 266/46 |
| 6,338,747 B1 | * | 1/2002 | Kosco .................. 75/243 |
| 6,391,083 B1 | * | 5/2002 | Akagi et al. .................. 75/231 |
| 6,482,352 B1 | * | 11/2002 | Sakata et al. .................. 419/26 |
| 6,579,492 B2 | * | 6/2003 | Wehler .................. 419/28 |
| 7,169,351 B2 | * | 1/2007 | Bengtsson et al. .................. 419/28 |
| 8,152,939 B2 | * | 4/2012 | Hasegawa et al. .................. 148/333 |
| 2003/0033904 A1 | | 2/2003 | Ilia |
| 2003/0215349 A1 | | 11/2003 | Nakamura et al. |
| 2004/0141871 A1 | | 7/2004 | Kondo et al. |
| 2006/0086204 A1 | | 4/2006 | Ilia et al. |

FOREIGN PATENT DOCUMENTS

| | | |
|---|---|---|
| JP | H11302787 A | 11/1999 |
| JP | 2001279349 A | 10/2001 |
| JP | 2007284769 A | 4/2006 |
| JP | 2008013818 A | 1/2008 |
| KR | 10-2003-0071540 A | 9/2003 |

OTHER PUBLICATIONS

The International Search Report and Written Opinion as mailed on Jul. 28, 2009 for International Patent Application PCT/US2008/088157.

Japanese Patent Office Notification of Reason for Refusal for corresponding JP Patent Application No. 2010-541495, drafted Sep. 26, 2013, 5 pages.

Extended European Search Report for corresponding EP Application No. 08870263.4, mailed Sep. 18, 2013, 4 pages.

* cited by examiner

PREALLOYED COPPER POWDER FORGED CONNECTING ROD

CROSS REFERENCE TO RELATED APPLICATIONS

This application represents the national stage application of International Application PCT/US2008/088157 filed 23 Dec. 2008, which claims priority to the U.S. provisional application having serial number 60/019,122 and entitled "PREALLOYED COPPER POWDER FORGED CONNECTING ROD" filed on Jan. 4, 2008, the entire contents of which are incorporated herein by reference in their entirety for all purposes.

STATEMENT REGARDING FEDERALLY SPONSORED RESEARCH OR DEVELOPMENT

Not applicable.

FIELD OF THE INVENTION

The present invention is generally related to connecting rods. In particular, the present invention is directed to powder forged connecting rods made from prealloyed powder metals.

BACKGROUND OF THE INVENTION

In reciprocating piston and internal combustion engines, connecting rods link the pistons to the crankshaft. Each connecting rod has a smaller end that is attached to a wrist pin in the piston and a larger end that is attached to the crankshaft. When the engine is run at high speeds, the connecting rods are subject to intense cyclic stress. Because the application demands that the connecting rods have great strength and hardness, these connecting rods are often made from steel or a steel alloy. Additionally, the application requires a precision connection between the ends of the connecting rod and the wrist pin and crankshaft to ensure smooth operation of the engine. Thus, the inner diameters of the ends of the connecting rod must be precisely dimensioned.

This combination of material and mechanical requirements has made powder metallurgy and, in particular, powder forging, a popular fabrication method for connecting rods over more traditional fabrication methods such as casting. Cast parts do not provide sufficient dimensional control of the connecting rod features. Additionally, cast parts require significant machining of the strong and hard material of the connecting rod. The lack of dimensional control means there is a substantial volume of difficult to machine material that needs to be removed. This machining is costly to perform and results in the production of a large amount of scrap material. However, connecting rods made using powder metallurgy have considerably more dimensional precision than cast parts. This increased amount of dimensional control reduces the amount of material that must be removed during machining and reduces the cost of secondary machining operations.

Preparation of a connecting rod using powder metallurgy is a multiple step process. First, a powder metal, which is often mixed with lubricant and wax, is pressed in a tool and die set to form a "green" compact. This green compact is then sintered in a furnace at temperatures just below the melting point of the main powder metal constituent. This sintering is typically performed in a reducing atmosphere to prevent oxidation of the connecting rod at the high temperatures. Although the sintered connecting rod is much stronger than the green compact, the sintered connecting rod is not fully dense. Because the connecting rod is not fully dense, the strength of the connecting rod is compromised. To further increase the density, the connecting rod can be powder forged. During powder forging, the sintered connecting rod is inserted into a die and subjected to stress at high temperatures. The application of stress at high temperatures induces plastic flow in the material, removing the excess porosity and results in a connecting rod that is nearly fully dense.

However, when made of steel or a steel alloy, even this nearly fully dense as-forged connecting rod is not considered suitable for use in an engine. When heated above certain temperatures, steel with certain amounts of carbon can form an austenitic phase in the microstructure. Upon cooling, this austenitic phase can form a martensitic phase. The amount of martensite and other phases formed is determined by the cooling profile of the part and can be approximated using a temperature, time, transformation diagram (TTT diagram) for the material being cooled. The martensitic phase is very hard, but is also very brittle. Due to this brittleness, the connecting rod would be incapable of sustaining the cyclic stresses applied during its use in an engine. Moreover, because the martensitic phase is hard and brittle, the machinability of the connecting rod is also reduced. To reduce this brittleness, the connecting rod must be tempered at temperatures lower than the solutionizing temperature to partially transform the martensitic phase into pearlite and bainite via carbon diffusion. This phase transformation toughens the steel and increases its ductility making the connecting rod suitable for use in an engine. The tempering step is often time consuming and can require substantial expenditures to provide the energy necessary to achieve the desired microstructure and its corresponding materials properties.

In addition to process variations, some of the materials properties of the connecting rod can be altered by the addition of alloying elements. Some alloying elements may directly alter the materials properties of the steel, while others may prevent the formation of undesirable inclusions. Moreover, most alloying elements or combinations of elements are effective only within certain ranges. Too little or too much of an alloying element or a combination of alloying elements may undesirably alter the microstructure and the properties of the connecting rod.

Alloying elements either can be admixed into a powder or can be prealloyed with an iron powder. Admixing of powders involves the mechanical mixing of two or more different powders to form a mixed powder having the individual grains of each of the initial powders. In contrast, prealloying involves the chemical addition of the alloying element with the iron powder to form a powder that has both iron and the alloying element in a single grain.

One element that can be alloyed with steel is copper. It is well known that copper can be a component in powder metal and can serve as a ferrite strengthener. A number of patents and patent applications disclose the use of copper as a separate admixed powder to be used in combination with ferrous powders. See U.S. Pat. No. 6,391,083 to Akagi et al., U.S. patent application Ser. Nos. 09/919,426 and 11/253,298 of Ilia. In particular, the Ilia patent applications disclose the use of the combinations of admixed iron powders and elemental copper powder in the production of connecting rods.

Likewise, the prealloying of copper along with other alloying elements in steel is known. U.S. Pat. No. 3,901,661 to Kondo et al. discloses a prealloyed steel powder for powder forging comprising up to 0.5 percent by weight carbon, 0.8 to 5.0 percent by weight copper, 0.1 to 0.7 percent by weight molybdenum, and up to 0.6 percent by weight manganese. The parts made from the powder in Kondo are quenched and tempered after powder forging to develop sufficient hardness (col. 7, lines 15-35). Moreover, molybdenum content in the disclosed range is a required prealloying element in order to attain sufficient hardness and strength (col. 5, lines 35-45).

Hence, it would be desirable to provide a more efficient process for making a connecting rod. In particular, it would be desirable to reduce the sintering time and temperature to process the connecting rod, thus reducing energy consumption, while still providing a connecting rod having sufficient or improved materials and mechanical properties.

BRIEF SUMMARY OF THE INVENTION

The present invention provides a process for manufacturing a steel connecting rod from a powder metal including a prealloyed powder consisting essentially of iron and copper.

The process for manufacturing the connecting rod comprises the steps of compacting, sintering, and powder forging. In the compacting step, a powder metal comprising a carbon source, such as an admixed graphite powder, and a prealloyed powder consisting essentially of iron and copper is compacted to form a green part. Optionally, other powders may be admixed with the powder metal. During the sintering step, the green part is sintered at high temperatures for a length of time to form a sintered part. Although more dense than the green part, the sintered part still has significant amounts of porosity as compared to wrought materials. This porosity can be greatly reduced during the powder forging step. During powder forging, the sintered part is placed in a die and subject to mechanical stresses at high temperatures. The application of stress at high temperatures induces the plastic flow of the material and reduces the number of pores in the part. Furthermore, because the part is placed in a die, the dimensions of the connecting rod are restricted, thus improving the dimensional precision of the final part.

Quite unexpectedly, the connecting rod made by the process described above has higher hardness and strength at similar or reduced sintering times and temperatures than connecting rods made with admixed copper. Further heat treatment steps, such as tempering, to reduce the brittleness of the forged connecting rod are not required. Tempering generally had been considered necessary to toughen and improve the ductility of the connecting rod prior to use.

The connecting rod made by this process results in better energy utilization. The process allows reduced sintering times and temperatures as well as permits the elimination of the tempering step.

The process of making connecting rods and the resulting connecting rod may contain a number of variations. For instance, the powder metal can further include manganese sulfide to improve the machinability of the connecting rod. Moreover, the powder metal may also include an admixed elemental copper powder to supplement the iron-copper prealloyed powder. Other powders known to those skilled in the art could also be admixed with a powder metal composition of this invention.

The present invention has many advantages. Copper segregation in the connecting rods is reduced because the copper is prealloyed in the iron powder. Because the copper is prealloyed, the connecting rods may be sintered for a shorter length of time or at lower temperatures, thus reducing the amount of energy necessary to process the product. However, the connecting rods made from this process have improved materials properties in comparison to connecting rods made from powders having a similar weight percent of copper in admixed form. The connecting rods made from this process have a higher hardness and tensile strength than powder forged materials made using powders having admixed copper. The prealloying of copper also eliminates the problem of undesirable segregation of admixed copper powder common to gravity feedshoes.

These and other features and advantages of the invention will appear in the detailed description which follows.

BRIEF DESCRIPTION OF THE DRAWINGS

In the description, reference is made to the accompanying drawings which illustrate an embodiment of this invention.

DETAILED DESCRIPTION OF THE INVENTION

Figure 1:
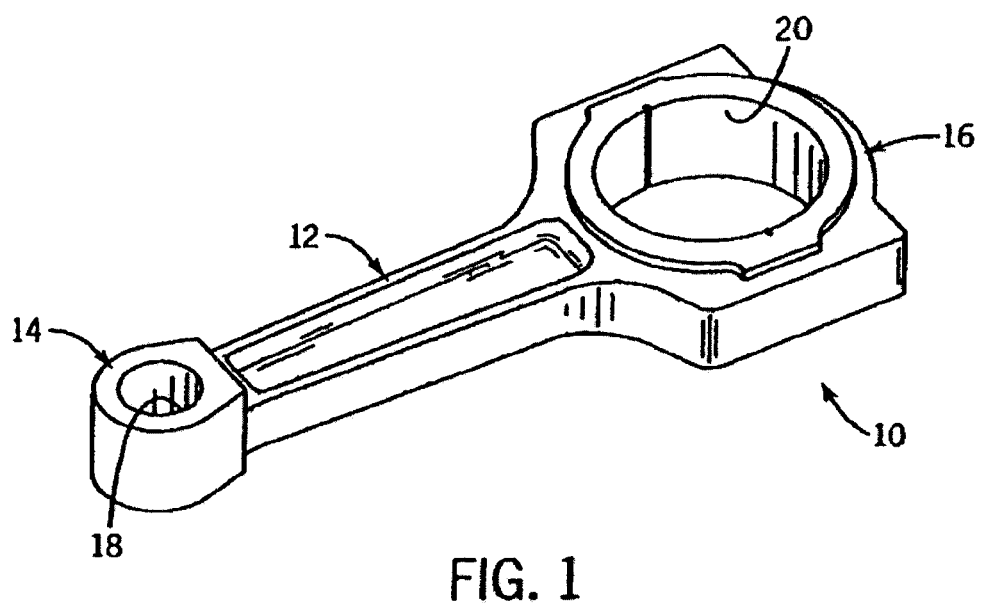
FIG. 1 is a perspective view of a connecting rod.

Referring now to FIG. 1, a connecting rod 10 is shown. The connecting rod 10 has a central beam section 12 that is integrally connected to a piston end 14 and a crankshaft end 16. The piston end 14 has a small hole 18 that can be connected to the wrist pin of a piston. The crankshaft end 16 has a large hole 20 that can be connected to the crankshaft of an engine. When an engine is in use, the combustion cycle reciprocating the piston in an engine cylinder results in the connecting rod cycling the location of the crankshaft end 16.

The connecting rod 10 is formed by a powder metal process. The process typically includes the steps of compaction, sintering, and powder forging.

The first step in the process is the compaction step. During the compaction step, the powder metal material is compacted into a green compact that is slightly larger than the final desired connecting rod. Compaction is typically performed by a press that has a feedshoe containing the powder metal and a tool and die set. To fill a cavity in the die with powder metal, the feedshoe slides over the die cavity which is sealed on the lower end by the lower portion of the tooling. Next, the feedshoe slides back to uncover the filled cavity. The tooling of the press then compacts the powder metal in the cavity to form the green compact. Finally, the lower half of the tooling ejects the green compact from the die.

It should be appreciated that the essence of the compaction step is that the powder metal is transformed from a loose particulate into a unitary green compact. Although a typical compaction step is described above, various modifications known to those skilled in the art can be made to the compaction step without deviating from the spirit of this invention.

The powder metal used to form the connecting rod can include a carbon source and a prealloyed powder consisting essentially of iron and copper. This means that the prealloyed powder will not substantially contain any other alloying elements such as, for example, molybdenum. One of the benefits of prealloying the copper is that segregation of copper will not occur in a gravity feedshoe. If the copper was admixed as a separate powder, then the cyclic motion of the feedshoe can result in the segregation of the copper powder. This segregation can result in a non-homogenous part composition across a batch of parts. Particularly, when small percentage changes in alloying elements can result in large changes in materials properties, maintaining homogeneity of the powder metal is important.

The powder metal can be admixed with other powders including, but not limited to, manganese sulfide, graphite, and copper powder.

Manganese sulfide is typically added to promote the machinability of the connecting rod. Because the inner diameters of the small hole 18 and large hole 20 must be dimensionally precise, they often will be machined to size. Also, the end part of the connecting rod at the bore 20 end is typically fractured off and reattached with bolts, so bolt holes on opposite sides of the bore 20 must be drilled and tapped. Therefore, the inclusion of some manganese sulfide will make this machining much easier. It should be noted that too much sulfur can result in the formation of iron sulfides, which can adversely affect the strength of the material. Thus, depending on the form of the manganese sulfide addition and the amount of time that it has to diffuse, it may be preferable to limit the amount of manganese sulfide.

Graphite can be added as a source of carbon to improve the strength of the part, although other sources of carbon could also be utilized. In addition, separate elemental copper powder may also be admixed with the prealloyed powder.

It should also be appreciated that the powder metal can include some amount of lubricant and polymeric binder to improve the ejection of the green compact from the die and to promote the formation of a unitary compact that can be easily handled without breaking. This lubricant and polymeric binder are typically hydrocarbons and may provide some amount of carbon.

Once the part is compacted into a green compact, the process may optionally include a "burn off" step. In this step, the green compact is exposed to temperatures much lower than the sintering temperatures, but high enough to decompose most of the lubricant and polymeric binder. The burning off of the lubricant and the polymeric binder reduces the carbon content in the part and provides an initial weak sintering of the part to improve handling of what would be an otherwise fragile part.

During the sintering step, the part is run through a furnace at a temperature lower than the melting temperature of the main constituent of the powder metal to sinter the green compact. Sintering is a diffusion-controlled process which is temperature dependent. High rates of diffusion at the sintering temperature cause the individual powder metal particulates to "neck" into one another to reduce the surface energy of the part as a whole. As sintering occurs, the pores formed between the powder metal particulates will decrease in size and the part will increase in density. Since there is an increase in density without a loss of material, the part dimensionally shrinks. The amount of shrinkage that occurs varies depending on the powder metal material, the sintering time, and the part geometry. Because the dimensions of the part shrink during sintering and porosity is also reduced during forging, the tooling designed to form the green compact must have slightly larger dimensions than the desired final part.

The inventors have found that many advantages are realized during the sintering step if the copper is prealloyed as opposed to admixed. Because the copper is prealloyed, it is unnecessary to wait for an elemental copper powder to diffuse into the iron matrix to achieve the desired microstructure morphology during sintering. Thus, prealloying copper can reduce sintering times and temperatures. The reduction of sintering times and temperatures reduces the energy consumption, reducing the cost of processing the connecting rod. Because copper is a ferrite strengthener, prealloying the copper in the iron matrix will improve the strength of the connecting rod.

Even after sintering, the part is still less than fully dense. As the pores in the material decrease in size, they form internal cavities. In order for these porous cavities to be removed by sintering, the volume must diffuse out of the material as vacancies. It is impractical to sinter the material long enough for this vacancy diffusion to occur. The fact that the parts are significantly less than fully dense is problematic because it adversely affects the strength of the part. Thus, further processing is necessary before the connecting rod may be used.

It is contemplated that the process might include repeating the sintering step to achieve sufficient diffusion of the admixed powders.

To eliminate the remaining porosity and increase the strength of the part, the process further includes the step of powder forging the sintered part. In powder forging, a sintered part is placed in a die, heated if necessary, and subjected to mechanical stress for a length of time. The application of stress at elevated temperatures induces the plastic flow of the material in the part. Subsequently, the remaining voids in the material are largely obliterated, creating a final part that is nearly fully dense. Because the part is inserted into a die that is tooled to the desired dimensions of the final part, the forged part has dimensions near the desired final part dimension.

Although the inventive process does not require further heat treatment for the connecting rod to have sufficient materials properties for use in an engine, it is possible that the part may be subject to a heat treatment or other post-forging processes to alter the microstructure or mechanical properties of the material.

After powder forging, the parts are subject to a secondary machining operation. In the case of a connecting rod, this machining operation will be performed on the inner diameters of the small and large ends, fracturing off the crank and bearing cap and machining the bolt holes.

Figure 2:
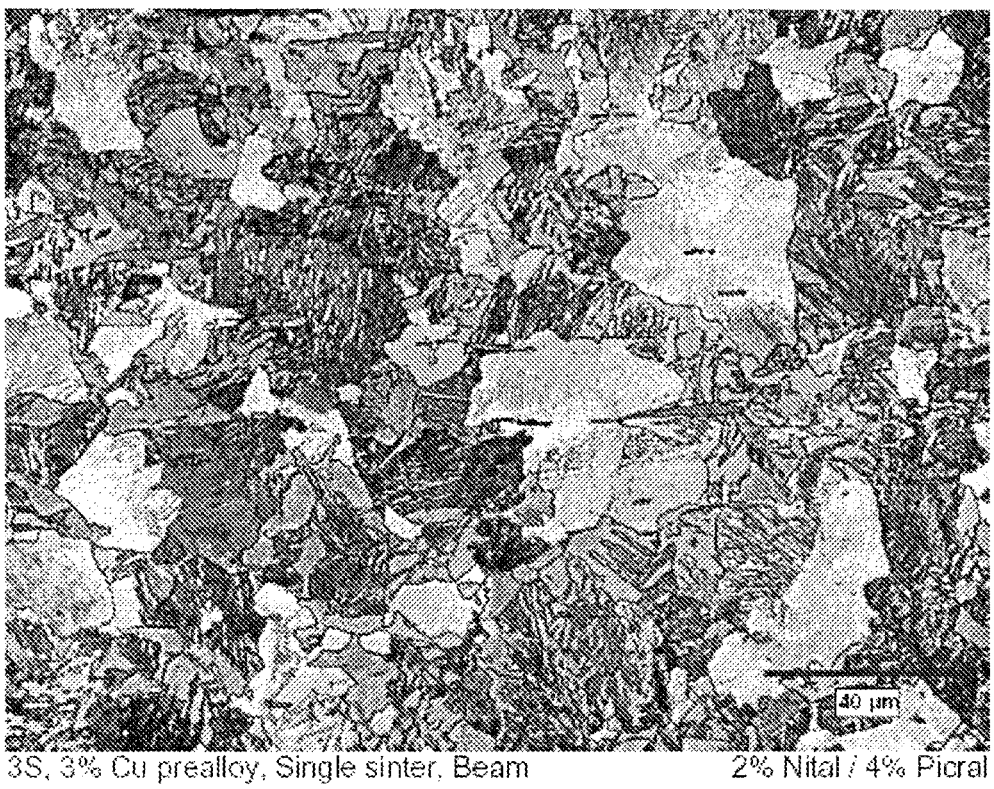
FIG. 2 is a photomicrograph of the beam section of the connecting rod formed from the prealloyed iron powder containing 3 percent by weight copper after a single sinter forge operation.
Figure 3:
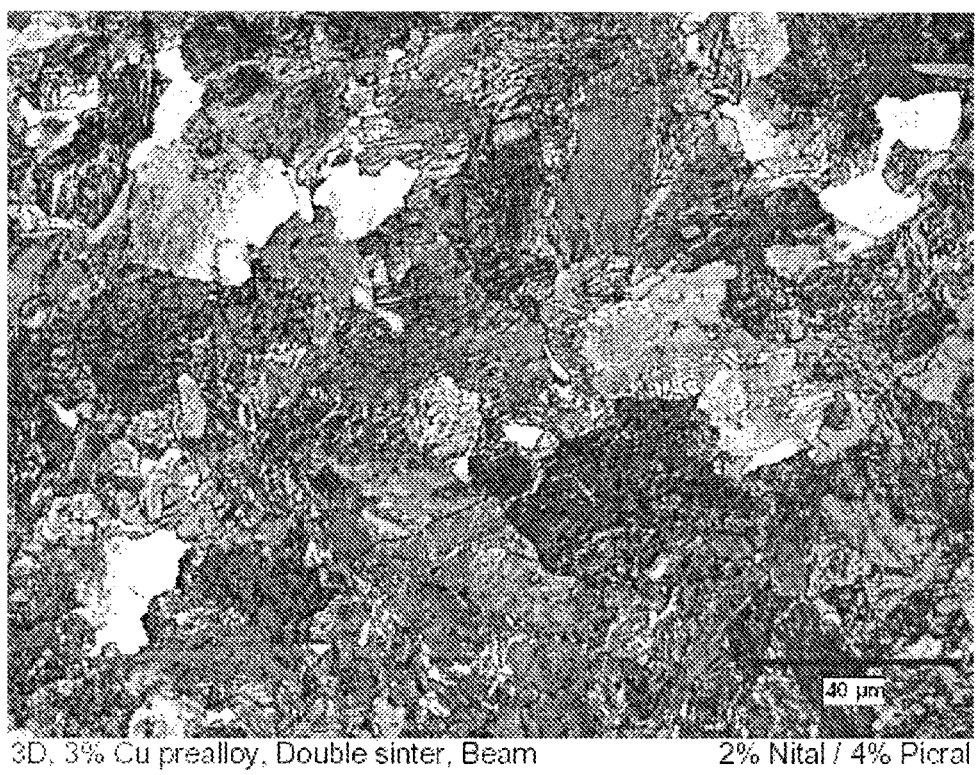
FIG. 3 is a photomicrograph of the beam section of the connecting rod formed from prealloyed iron powder containing 3 percent by weight copper after a double sinter forge operation.
Figure 4:
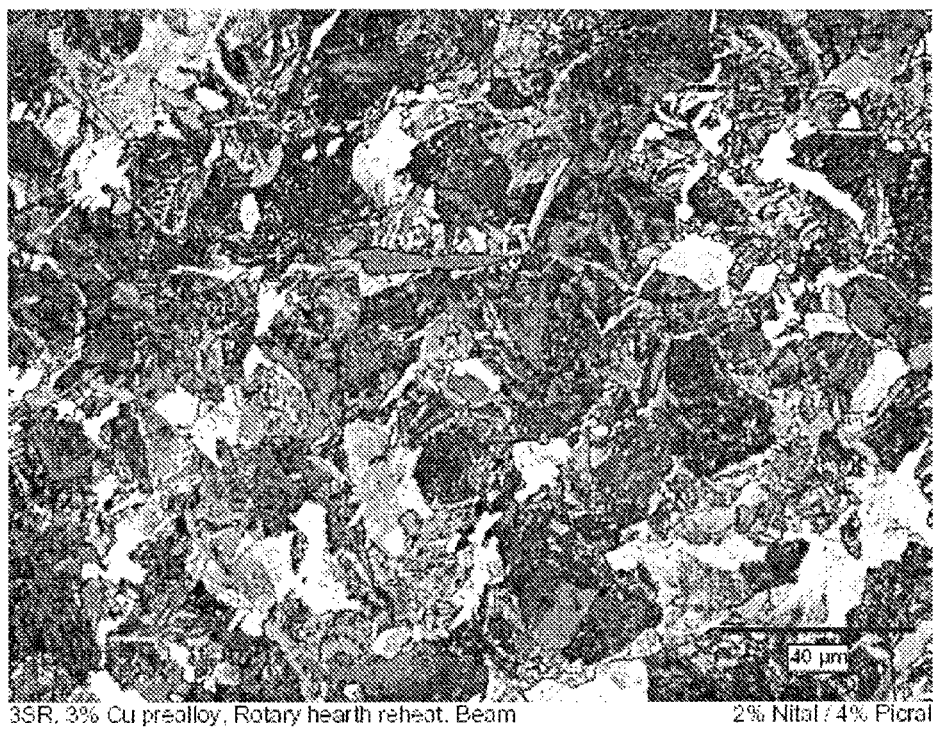
FIG. 4 is a photomicrograph of the beam section of the connecting rod formed from prealloyed iron powder containing 3 percent by weight copper after a single sinter plus a rotary forge operation.

Referring now to FIGS. 2, 3, and 4, photomicrographs of one powder metal composition of this invention are shown. FIG. 2 shows the microstructure of a sample that has been once-sintered and then powder forged. FIG. 3 shows the microstructure of a sample that has been double-sintered and then powder forged. FIG. 4 shows the microstructure of a sample that has been once-sintered and then rotary forged. The powder metal composition of each of the three photomicrographs includes a prealloy powder metal including 3 percent by weight copper and iron. All of the samples have been etched with an etching solution containing 4 percent picral followed by 2 percent nital to reveal the grain boundaries and microstructure. All of the photomicrographs have scale bars in the lower left right hand corner which indicates that the length of the scale bar is 40 micrometers. Thus, the average grain size is approximately 10 to 30 micrometers.

All of the micrographs show that the microstructures contain little to no martensite. This lack of martensite means that the material does not need to be tempered prior to use in the engine because the material is not brittle. Instead, microstructures can be seen that include the pearlite (the white lamellar grains) and ferrite (the solid grains). Bainite may also be formed. Additionally, the elongated grey-colored grains include manganese sulfide additive to improve the machinability of the part. The martensite-free microstructure indicates that the material is not brittle and, therefore, does not require any post-forging heat treatments prior to use.

The mechanical properties of a number of samples made from elemental copper powder, prealloyed iron and copper powder, and a mix of the prealloyed and elemental powders were measured. A first sample was prepared that included 1 percent prealloyed copper and 2 percent admixed copper. A second sample was prepared that included 2 percent prealloyed copper and 1 percent admixed copper. A third sample was prepared that included 3 percent prealloyed copper. The remainder of the material in each of the three prealloyed powders was iron. Graphite and manganese sulfide were also admixed into each of the powder metals. All of the samples were compacted and then sintered at 2080° F. During sintering, the length of time that the samples were exposed to a temperature over 2000° F. was approximately 14 minutes. The double sinter forged samples were sintered again. After the sintering step or steps, all samples were then powder forged. The sinter forged and double sinter forged samples were sintered and then forged at 2080° F. The sintered and rotary forged samples were single sintered and then rotary forged at a temperature of 2125° F.

Table 1 shows the maximum load that each of the five samples having various copper chemistries were capable of withstanding prior to failure.

TABLE 1

Maximum Tensile Load Before Failure (lbs)

| Material | Sinter Forged Forging Temp 2080° F. | | Double Sinter Forged Forging Temp 2080° F. | | Sintered and Rotary Forged Forging Temp 2125° F. |
| --- | --- | --- | --- | --- | --- |
| 1% Prealloy + 2% Admixed Cu | 36960 | 36185 | 34665 | 35148 | 39392 |
| 2% Prealloy + 1% Admixed Cu | 35544 | 34050 | 34667 | 38227 | 35383 |
| 3% Prealloy Cu | 37898 | 38667 | 37187 | 35336 | 42504 |

Table 1 shows that the samples containing all 3 percent of the copper as prealloyed copper were capable of withstanding greater loads before failure than the samples prepared containing some percent of the copper as admixed copper.

Table 2 shows the average surface hardness of the samples on the non-chamfered and chamfered sides of the sample.

TABLE 2

Average Surface Hardness (HRC)

| Material | Sinter Forged | | Double Sinter Forged | | Sintered and Rotary Forged | |
| --- | --- | --- | --- | --- | --- | --- |
| | Non-Chamfer | Chamfer | Non-Chamfer | Chamfer | Non-Chamfer | Chamfer |
| 1% Prealloy + 2% Admixed Cu | 24.4 | 26.7 | 28.8 | 30.8 | 31.0 | 33.0 |
| 2% Prealloy + 1% Admixed Cu | 30.1 | 32.2 | 30.6 | 32.5 | 32.2 | 32.9 |
| 3% Prealloy Cu | 32.2 | 32.0 | 32.2 | 32.9 | 34.8 | 35.3 |

Table 2 indicates that the average surface hardness tends to increase as the amount of prealloyed copper increases in the samples. It can also be observed that the double sinter forged samples possessed greater surface hardness than the single sinter forged samples as measured at the same location of the different samples. Moreover, the sintered and rotary forged samples possessed even greater surface hardness than either of the other two processes when measured at a similar location on the sample.

Table 3 shows the forged densities at various part locations and carbon content of connecting rods made from each of the various mixtures of prealloyed and admixed copper materials.

TABLE 3

Forged Densities (g/cm$^3$) and Carbon Content

| Material/Process | | Crank End | Beam | Pin | Carbon % |
| --- | --- | --- | --- | --- | --- |
| 1% Prealloy + 2% Admixed Cu | Sinter Forged | 7.815 | 7.817 | 7.843 | 0.568 |
| | Double Sinter Forged | 7.817 | 7.796 | 7.854 | 0.565 |
| | Sintered and Rotary Forged | 7.840 | 7.847 | 7.833 | 0.559 |
| 2% Prealloy + 1% Admixed Cu | Sinter Forged | 7.821 | 7.820 | 7.845 | 0.613 |
| | Double Sinter Forged | 7.827 | 7.805 | 7.839 | 0.592 |
| | Sintered and Rotary Forged | 7.846 | 7.846 | 7.837 | 0.589 |
| 3% Prealloy Cu | Sinter Forged | 7.820 | 7.820 | 7.841 | 0.617 |
| | Double Sinter Forged | 7.821 | 7.780 | 7.840 | 0.620 |
| | Sintered and Rotary Forged | 7.847 | 7.834 | 7.853 | 0.577 |

The forged densities of all of the connecting rods when measured at the same location on the connecting rod were similar. Specifically, the densities for connecting rods made from each of the various powder chemistries when similarly processed had similar forged densities. Given that the samples would all have had similar densities, it can therefore be stated that differences in the mechanical properties shown in Tables 1 and 2 were not the result of increased densities, but rather were the result of the difference in the microstructure of the sintered parts as a result of the inventive process.

Although the present invention has been described with respect only to connecting rods, the process described above for manufacturing connecting rods may be used to fabricate any other powder metal part. The process is most valuable for powder metals that require high strength and good machinability by avoiding the martensitic transformation.

It is specifically intended that the present invention not be limited to the embodiments and illustrations contained herein, but include modified forms of those embodiments including portions of the embodiments and combinations of elements of different embodiments as come within the scope of the following claims.

We claim:

1. A process for manufacturing connecting rods comprising:
 - compacting a powder metal into a green compact, the powder metal comprising a carbon source and a prealloyed powder consisting essentially of iron and 1 to 5 percent copper by weight;
 - sintering the green compact for a length of time to form a sintered part; and
 - powder forging the sintered part, the powder forging inducing plastic flow in the sintered part to form a connecting rod such that the resultant sintered and forged connecting rod is substantially free of martensite and does not require further heat treatment after forging and before use in an engine.

2. The process of claim 1, further comprising the step of installing the connecting rod in an engine after forging and without any heat treating of the connecting rod after forging.

3. The process of claim 1, wherein the carbon source is an admixed graphite powder.

4. The process of claim 1, wherein the powder metal further comprises an admixed manganese sulfide powder.

5. The process of claim 1, wherein the powder metal further comprises an admixed copper powder.

6. The process of claim 1, wherein the prealloyed powder consists essentially of iron and about 3 percent copper by weight.

7. The process of claim 1, further comprising sintering the green compact twice before subjecting the sintered part to powder forging.

8. The process of claim 1, wherein the powder forging is performed by a rotary forge hearth.

* * * * *

UNITED STATES PATENT AND TRADEMARK OFFICE
CERTIFICATE OF CORRECTION

PATENT NO. : 8,935,852 B2  
APPLICATION NO. : 12/810109  
DATED : January 20, 2015  
INVENTOR(S) : Ian W. Donaldson et al.

Page 1 of 1

It is certified that error appears in the above-identified patent and that said Letters Patent is hereby corrected as shown below:

On the title page, after the item Prior Publication Data section, insert:
--Related U.S. Application Data
(60) Provisional application No. 61/019,122, filed on Jan. 4, 2008.--

In the Specification
Col. 1, Line 10, "60/019,122" should be --61/019,122--

Signed and Sealed this
Fifth Day of May, 2015

Michelle K. Lee
*Director of the United States Patent and Trademark Office*